Patented Apr. 15, 1941

2,238,669

UNITED STATES PATENT OFFICE 2,238,669

PREPARATION OF SILICANES

Richard H. Wiley, Wilmington, Del., assignor to E. I. du Pont de Nemours & Company, Wilmington, Del., a corporation of Delaware No Drawing. Application August 2, 1940, Serial No. 350,061

11 Claims. (Cl. 260—607)

This invention relates to the prepartion of synthetic organic compounds and more particularly to the preparation of silicanes.

Attempts have been made to prepare silicon compounds wherein all four valences of the silicon are satisfied by hydrocarbon groups from fluorine compounds of silicon, but in general these attempts have been unsuccessful. See Gierut et. al., J. Am. Chem. Soc. 58 786, 897 (1936); Medoks et al., J. Gen. Chem. (U. S. S. R.) 7 2007 (1937). Similarly silicon compounds having three valences attached to hydrocarbon radicals and one to fluorine are unreactive toward sodium in liquid ammonia.

This invention has as an object the provision of a process for preparing silicon compounds having all four valences attached through carbon to silicon from fluorine compounds of silicon. Other objects will appear hereinafter.

These objects are accomplished by the following invention wherein a compound of silicon having at least one valence satisfied by fluorine and having each valence of the silicon not attached to fluorine satisfied by a monovalent organic radical attached to the silicon through carbon and free from groups reactive with the sodium compound employed, and preferably a monovalent hydrocarbon radical, is reacted with an organic compound of an alkali metal wherein the alkali metal is directly attached through carbon to a monovalent organic radical.

In the process of the present invention, the silicon fluoride is reacted with the appropriate alkali metal organometallic compound. The alkali metal organometallic compound and the silicon fluorine compound as such are not new and any method of making these compounds known to the art or hereafter discovered may be used to prepare these reactants.

The more detailed practice of the invention is illustrated by the following examples, wherein parts given are by weight. There are of course many forms of the invention other than these specific embodiments.

EXAMPLE I

*Preparation of tetraphenylsilicane from phenylsodium and triphenylfluorosilicane*

In a reactor having two openings equipped with a stirrer and an efficient condenser are placed 75 parts of dry ether, 8.13 parts of chlorobenzene, 3.46 parts of sodium, and 20 parts of triphenylfluorosilicane in 75 parts of dry ether. On warming gently and stirring, a vigorous reaction takes place and the sodium disintegrates. After the spontaneous refluxing ceases the solution is refluxed for three hours longer on a steam bath. The mixture is then filtered and the solids which are separated are extracted with 540 parts of hot benzene. The benzene solution is evaporatod to ¼ of its former volume and on cooling crystals separate. The yield of tetraphenylsilicane, melting point 232–3° C., is 15.1 parts or 63%.

EXAMPLE II

*Preparation of tetraphenylsilicane from silicon tetrafluoride and phenylsodium*

In a reactor containing four openings equipped with stirrer, condenser, dropping funnel, and gas inlet tube are placed 360 parts of dry benzene and 46 parts of finely divided sodium. The reactor is swept out with dry, oxygen-free nitrogen. With the gas inlet tube closed, 111.0 parts of chlorobenzene are placed in the dropping funnel and 3 or 4 parts of this are added to the reaction mixture. Stirring and heating are applied to the reactor and when the reaction of the chlorobenzene with the sodium is well started, a stream of silicon tetrafluoride is started through the gas inlet tube from a gas generator attached to the tube. The gas generator is charged with 100 parts of sodium fluosilicate and 15 parts of powdered silicon dioxide, to which is added gradually 450 parts of concentrated sulfuric acid. The evolution of silicon tetrafluoride begins immediately on adding the sulfuric acid, and after all of the acid has been added the temperature of the generator is gradually raised to 150° C. by heating in an oil bath. The gas is swept from the generator into the reaction mixture by means of a stream of dry oxygen-free nitrogen. The passage of silicon tetrafluoride is begun when the formation of phenylsodium is well started and continued while the remainder of the chlorobenzene is added and for a short time thereafter. The solution is stirred for three hours and then allowed to stand overnight. Two layers separate. The top layer is removed by siphoning from the gas inlet tube. The residue is extracted twice with 135 parts of cold benzene and once with 135 parts of hot benzene. On evaporation of the benzene solution, 9.5 parts or 23% of tetraphenylsilicane, melting point 230–2° C., is obtained.

The invention is not limited to the examples given above but is generic to the process wherein the fluorine atoms in any compound $R_xSiF_y$, where R is a monovalent organic radical free from groups reactive with alkali metal when the metal is attached directly to carbon, and preferably hydrocarbon, $x$ is 0 to 3, $y$ is 4 to 1, and $x+y$ is 4, are replaced by any monovalent organic radical free from groups reactive with alkali metal when attached directly to carbon, and preferably hydrocarbon group, through the use of any alkali metal organometallic compound and preferably alkali metal hydrocarbon, to give an organic compound of silicon wherein the four valences of the silicon are attached through carbon to monovalent organic radicals, preferably hydrocarbon.

The organic radical of the alkali metal organometallic compound is obviously free from groups reactive with the C—Na or other alkali metal carbon bond such as hydroxyl, amino $NH_2$, or monosubstituted amino NHR, carboxyl, nitro, nitroso, mercaptan, amido, active methylene $(CO-CH_2-CO)$, etc. since a compound containing the C—Na and groups reactive therewith is incapable of existence. The groups which cannot coexist with the C-alkali metal linkage in one compound are comprehended in the group of compounds containing active hydrogen (as determined, for example, by the Zerewitenoff test). The organic radical may be aliphatic, alicyclic, aromatic, or of the mixed aliphatic aromatic type. For example, it may be ethyl, propyl, amyl, isoamyl, octyl, allyl, cyclohexyl, phenyl, tolyl, xylyl, or benzyl. It may also be a mixture of these such as phenyl and tolyl, p- and o-tolyl, tolyl and xylyl, or phenyl and benzyl. In general the radical may be, if aliphatic, branched or straight chain and either saturated or unsaturated; and if cyclic, it can contain a hetero atom, such as oxygen as in tetrahydrofurfuryl, sulfur as in tetrahydrothienyl, tertiary amino nitrogen as in pyridyl, etc. Substituents such as dialkylamino, alkoxy, and alkenyl can be present as in p-dimethylaminophenyl, p-methoxyphenyl, or styryl. The alkali metal may be lithium, sodium, potassium, rubidium, or caesium. Sodium hydrocarbons are preferred.

The silicon fluorine compound used may be any compound where there are one to four fluorine atoms attached to a silicon atom carrying respectively three to zero organic radicals as previously defined. The silicon compound must be free from active hydrogen and, except for the fluorine attached to the silicon atom, it must be free from other groups reactive with alkali metal attached to carbon. Compounds of the type $R_2SiF_2$, e. g., diethyldifluorosilicane, and $RSiF_3$, e. g., benzyltrifluorosilicane, are therefore included. Compounds wherein all the radicals, other than fluorine, attached to the silicon are hydrocarbon, are preferred.

The reactants for this reaction, i. e., the silicon fluoride and the alkali metal organometallic compound may be prepared by any known or convenient method. The preparation of the alkali metal organometallic compound need not involve the reaction of a hydrocarbon halide with an alkali metal as in Examples I and II. The compound may be prepared by means of a metal replacement reaction, such as that between amylsodium and benzene or by any other means. It need not be prepared in the presence of the silicon fluoride as in Example I but may also be prepared before the addition of the silicon fluoride, or as the silicon fluoride is added to the reaction mixture as in Example II.

In general, the reaction requires conditions which exclude the presence of both oxygen and water vapor present in the atmosphere. For this purpose it is generally advisable to run the reaction either in an inert atmosphere such as an atmosphere of carbon monoxide, nitrogen, argon, helium, methane, ethylene, ethane, dimethyl ether, but preferably the dry nitrogen used in Example II, or in such a manner as to protect the reaction mixture from the atmosphere by means of a blanket of vapors formed by the solvent used in the reaction as in Example I.

The silicon fluoride used in the reaction may be prepared through the interaction of silicon tetrafluoride and an organometallic compound, such as an organomagnesium compound, carried out in such a manner as to obtain the desired degree of substitution of the fluorine atoms by hydrocarbon radicals. Silicon tetrafluoride can be prepared from sodium fluosilicate and sulfuric acid, as given in Example II, but need not necessarily be so prepared. It can also be prepared, for instance, from fluorspar and silicon dioxide with sulfuric acid, or by any other convenient method.

The solvent used for the reaction between the alkali metal organometallic compound and the silicon fluoride must be inert, including aliphatic hydrocarbons, e. g., petroleum ether; ethers of the types R—O—R''—O—R or R—O—R', where R, R' and R'' are aliphatic or mononuclear aromatic, e. g., dibutyl ether, glycol dimethyl ether, alkyl aromatic ethers, such as phenetol, anisol and the like; tertiary amines, cyclic ethers, e. g., dioxane. By inert solvent is thus meant any solvent which does not, by virtue of the presence of active hydrogen, halogen or other atoms in its molecule, react with the alkali metal hydrocarbon that is being formed.

The temperature of the reaction in general is determined by the type of solvent used. The preferred range is 0–150° C. The lower limit however is that at which it is possible to obtain a reasonably rapid reaction between the desired ingredients, and the upper limit in general is either the boiling point of the solvent or the temperature at which some predominant side reaction will set in.

The amount and time of heating of the reaction mixture after all of the ingredients are present depends largely on the rate of reaction and is not limited to three hours, as given, for instance, in Example I.

The isolation of the tetrahydrocarbon silicane from the reaction mixture need not necessarily be accomplished by extraction with the solvent used for the reaction itself, as given in Examples I and II. It may be carried out in any manner which will effectively separate the salts, which have formed in the reaction, from the organic silicane formed. Thus, either filtration, distillation, or extraction may be used for this process. In addition, it may be deemed advisable to remove the salts by extracting them with a solvent such as water.

The process of the present invention is of use in affording a convenient and inexpensive process for the preparation of silicon compounds having all four valences attached to hydrocarbon radicals. These products are of value where thermally stable organic compounds are required. The products have a wide range of boiling points and melting points and, by virtue of their thermal stability, are applicable as heat exchange media.

The above description and examples are intended to be illustrative only. Any modification of or variation therefrom which conforms to the spirit of the invention is intended to be included within the scope of the claims.

What is claimed is:

1. Process for the preparation of organic compounds of silicon having all four valences of the silicon attached through carbon which comprises reacting a compound of silicon which has at least one valence of the silicon attached to fluorine and in which all valences of the silicon not attached to fluorine are attached through carbon to monovalent organic radicals free from groups reactive with alkali metal alkyls with an organometallic alkali metal compound.

2. Process for the preparation of organic compounds of silicon having all four valences of the silicon attached through carbon which comprises reacting a compound of silicon which has at least one valence of the silicon attached to fluorine and in which all valences of the silicon not attached to fluorine are attached through carbon to monovalent organic radicals free from groups reactive with alkali metal alkyls with an organosodium compound.

3. Process for the preparation of organic compounds of silicon having all four valences of the silicon attached through carbon which comprises reacting a compound of silicon which has at least one valence of the silicon attached to fluorine and in which all valences of the silicon not attached to fluorine are attached through carbon to monovalent organic radicals free from groups reactive with alkali metal alkyls with an organometallic alkali metal compound wherein the organic radical attached to the alkali metal through carbon is a monovalent hydrocarbon radical.

4. Process for the preparation of organic compounds of silicon having all four valences of the silicon attached through carbon which comprises reacting a compound of silicon which has at least one valence of the silicon attached to fluorine and in which all valences of the silicon not attached to fluorine are attached through carbon to monovalent hydrocarbon radicals free from groups reactive with alkali metal alkyls with an organometallic alkali metal compound.

5. Process for the preparation of organic compounds of silicon having all four valences of the silicon attached through carbon which comprises reacting a compound of silicon which has at least one valence of the silicon attached to fluorine and in which all valences of the silicon not attached to fluorine are attached through carbon to monovalent hydrocarbon radicals free from groups reactive with alkali metal alkyls with an organometallic alkali metal compound, wherein the organic radical attached to the alkali metal through carbon is a monovalent hydrocarbon radical.

6. Process for the preparation of organic compounds of silicon having all four valences of the silicon attached through carbon which comprises reacting a compound of silicon which has at least one valence of the silicon attached to fluorine and in which all valences of the silicon not attached to fluorine are attached through carbon to monovalent hydrocarbon radicals free from groups reactive with sodium alkyls with an organometallic sodium compound, wherein the organic radical attached to the alkali metal through carbon is a monovalent hydrocarbon radical.

7. Process for the preparation of organic compounds of silicon having all four valences of the silicon attached through carbon which comprises reacting silicon tetrafluoride with an organometallic alkali metal compound.

8. Process for the preparation of organic compounds of silicon having all four valences of the silicon attached through carbon which comprises reacting silicon tetrafluoride with an organometallic sodium compound.

9. Process for the preparation of organic compounds of silicon having all four valences of the silicon attached through carbon which comprises reacting silicon tetrafluoride with an organometallic alkali metal compound wherein the organic radical attached to the alkali metal through carbon is a monovalent hydrocarbon radical.

10. Process for the preparation of organic compounds of silicon having all four valences of the silicon attached through carbon which comprises reacting silicon tetrafluoride with an organometallic sodium compound wherein the organic radical attached to the sodium through carbon is a monovalent hydrocarbon radical.

11. Process which comprises reacting silicon tetrafluoride with chlorobenzene and sodium.

RICHARD H. WILEY.